US006880845B1

(12) United States Patent
Broyles et al.

(10) Patent No.: US 6,880,845 B1
(45) Date of Patent: Apr. 19, 2005

(54) WHEELCHAIR FOOTREST RETRACTOR

(76) Inventors: William H. Broyles, 3710 S. Country Club Rd., Garland, TX (US) 75043; Daniel F. Boone, 2526 82nd St., Ste. F, Lubbock, TX (US) 79423

( * ) Notice: Subject to any disclaimer, the term of this patent is extended or adjusted under 35 U.S.C. 154(b) by 0 days.

(21) Appl. No.: 10/689,546

(22) Filed: Oct. 20, 2003

(51) Int. Cl.[7] .................................................. B62M 1/14

(52) U.S. Cl. ................................ 280/250.1; 280/304.1; 297/423.33; 297/423.36

(58) Field of Search ........................... 280/250.1, 304.1, 280/288.4; 180/65.1; 297/423.3, 423.33, 423.36

(56) References Cited

U.S. PATENT DOCUMENTS

| | | | | |
|---|---|---|---|---|
| 2,793,682 A | | 5/1957 | Duke | 155/171 |
| 2,991,831 A | | 7/1961 | Jennings | 294/434 |
| 3,790,212 A | | 2/1974 | Suyetani | 297/429 |
| 3,931,650 A | | 1/1976 | Miller | 4/134 |
| 4,012,074 A | | 3/1977 | O'Reilly et al. | 297/434 |
| 4,033,624 A | | 7/1977 | Jun | 297/434 |
| 4,101,143 A | * | 7/1978 | Sieber | 280/42 |
| 4,141,094 A | * | 2/1979 | Ferguson et al. | 5/85.1 |
| 4,463,985 A | | 8/1984 | Kynast | 297/433 |
| 4,506,930 A | | 3/1985 | Lambert | 297/423 |
| 4,770,467 A | | 9/1988 | Zinn | 297/429 |
| 4,790,553 A | * | 12/1988 | Okamoto | 280/250.1 |
| 4,988,114 A | | 1/1991 | Thornton et al. | 280/304.1 |
| 5,277,477 A | | 1/1994 | Sharff et al. | 297/423.21 |
| 5,358,266 A | | 10/1994 | Roth et al. | 280/304.1 |
| 5,393,082 A | | 2/1995 | Fenley | 280/291 |
| 5,401,045 A | * | 3/1995 | Foerster et al. | 280/250.1 |
| 5,522,644 A | | 6/1996 | Peek | 297/423.26 |
| 5,711,580 A | | 1/1998 | Barclay et al. | 297/423.33 |
| D395,263 S | | 6/1998 | Ponce | D12/133 |
| 5,779,316 A | | 7/1998 | Sugawa et al. | 297/423.26 |
| 5,833,261 A | | 11/1998 | Brown et al. | 280/642 |
| 6,217,050 B1 | | 4/2001 | Dickie et al. | 280/291 |
| 6,234,576 B1 | | 5/2001 | Fleigle | 297/423.37 |
| 6,338,493 B1 | * | 1/2002 | Wohlgemuth et al. | 280/30 |
| 6,422,653 B1 | | 7/2002 | Szczepanski et al. | 297/423.29 |
| 6,499,756 B1 | | 12/2002 | Amirola | 280/304.1 |

* cited by examiner

*Primary Examiner*—Lesley D. Morris
*Assistant Examiner*—L. Lum
(74) *Attorney, Agent, or Firm*—Thompson & Gustavson, L.L.P.

(57) ABSTRACT

A wheelchair footrest retractor (10) is disclosed for use with a footrest (16, 18) in a wheelchair (14) to allow the wheelchair user or caregiver to readily manipulate the footplates (20) between an upper retracted position and a lower use position by simply manipulating a handle(56) located to the side of the knee of the wheelchair user. The wheelchair footrest retractor (10) can be mounted to the wheelchair with little or no modification of the wheelchair. The rod (58) in the wheelchair footrest retractor (10) can be adjusted in length to fit a particular wheelchair and also adjusted when the length of the footrest(16, 18) is adjusted.

13 Claims, 4 Drawing Sheets

FIG. 3
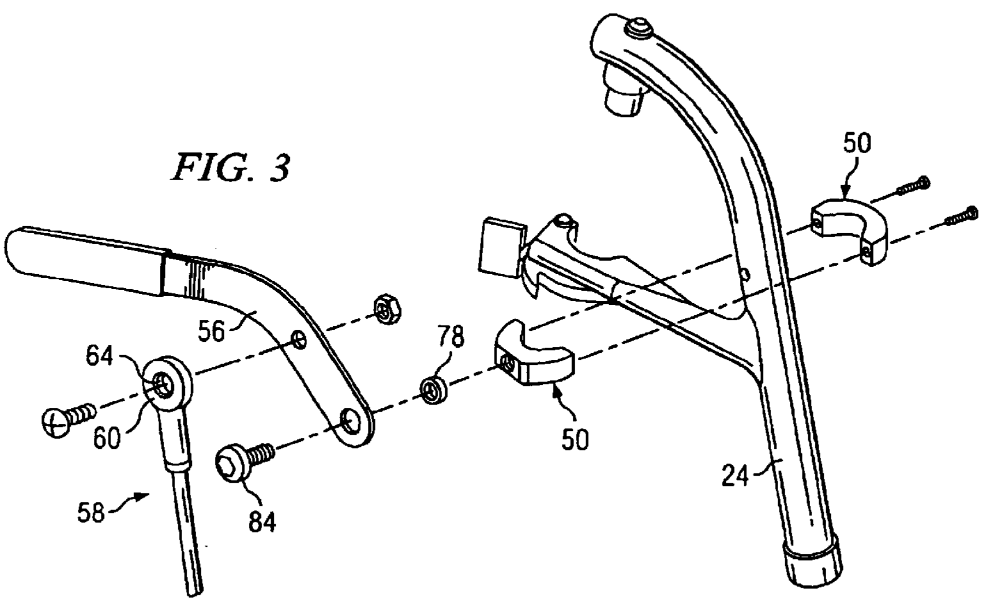
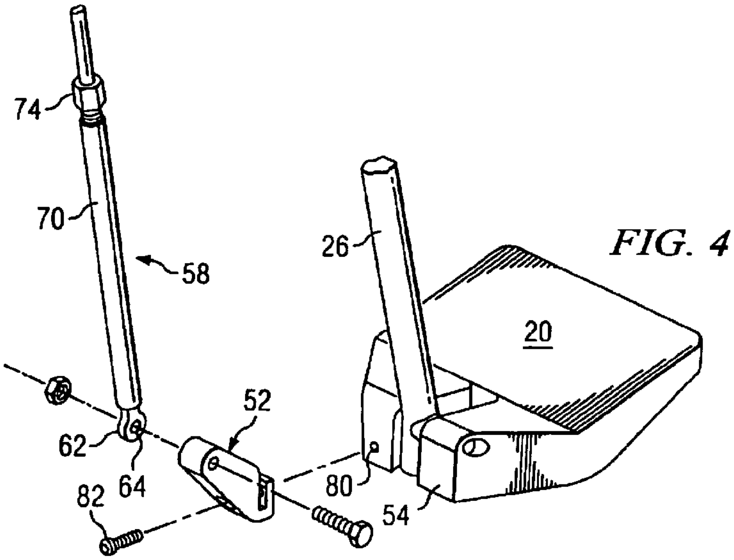
FIG. 4

WHEELCHAIR FOOTREST RETRACTOR

TECHNICAL FIELD

This invention relates to a mechanism for a wheelchair, and more particularly to a mechanism for raising and lowering a footplate on a footrest mounted to the wheelchair.

BACKGROUND OF THE INVENTION

People use wheelchairs because they have difficulty walking. However, the wheelchair user must somehow get into and out of the wheelchair when necessary. Many users have enough mobility to be able to stand up or lift themselves off the wheelchair. Others need assistance.

Most wheelchairs are equipped with a pair of footrests having footplates to support the feet and legs of the user when in the wheelchair. Even though the footplates are typically designed to pivot up to a retracted position and the footrests can often be pivoted out of the way, the footrests and footplates make it difficult to get in and out of the wheelchair. The footplates are difficult to reach and therefore move out of the way. As a result, wheelchair users are often not able to stand up or lift themselves off the wheelchair without assistance because they are not able to raise or lower the footplates by themselves. The footplates are also difficult for caregivers to reach because they must bend over almost to the floor to reach them.

A common design for a wheelchair footrest includes a "swing away" mechanism. That is, the footrest is attached to the wheelchair by means of a bracket with support pins that allow the entire footrest to rotate outwardly from the wheelchair. While the footplate will move out of the way of the user if the footrest is swung away, the design is unsatisfactory. The bracket release lever for the footrest is typically located at a point below the knee of the user, making it difficult for the user or a caregiver to reach. In addition, this design makes the effective footprint of the wheelchair very wide. Thus, it does not work well in the confines of a public restroom and gets in the way of a caregiver trying to assist the user.

SUMMARY OF THE INVENTION

In accordance with one aspect of the present invention, a wheelchair footrest retractor is disclosed for use on a wheelchair having a footrest, the footrest having a footplate pivoted thereto. The wheelchair footrest retractor includes an upper bracket mounted to the footrest and a lower bracket mounted to the footplate. A handle is pivoted to the upper bracket in a position to be readily manipulated by a user in the wheelchair or a caregiver. A rod is pivoted at a first end to the handle and at a second end to the lower bracket. The user can manipulate the handle to move the footplate between a downward use position and an upper retracted position.

In accordance with another aspect of the present invention, the length of the rod is adjustable to adapt the wheelchair footrest retractor to a particular wheelchair.

In accordance with another aspect of the present invention, the wheelchair footrest retractor is mounted to the wheelchair footrest without significant modification of the wheelchair footrest, and no modification to the rest of the wheelchair.

In accordance with another aspect of the invention, the wheelchair footrest retractor allows removable wheelchair footrests to be removed and remounted in the normal way.

In accordance with another aspect of the invention, the wheelchair footrest retractor does not increase the total width of the wheelchair.

BRIEF DESCRIPTION OF THE DRAWINGS

A more complete understanding of the invention and its advantages will be apparent from the following Detailed Description when taken in conjunction with the accompanying Drawings, in which:

FIG. 3 is an exploded view of the upper portion of the wheelchair footrest retractor mounted on the footrest;

FIG. 4 is an exploded view of the lower portion of the wheelchair footrest retractor mounted on the footrest.

DETAILED DESCRIPTION

Figure 1:
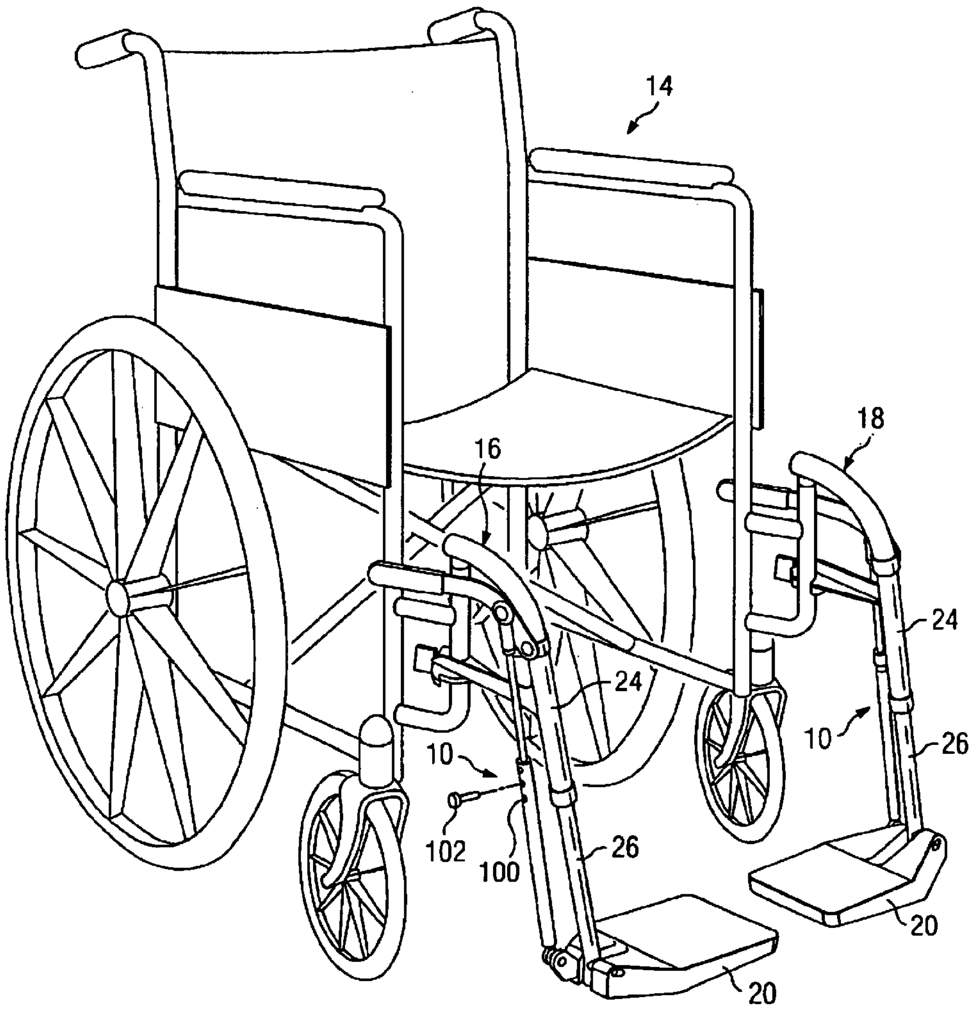
FIG. 1 is a perspective view of a wheelchair on which a wheelchair footrest retractor forming a first embodiment of the present invention is installed.

Referring now to the drawings, wherein like reference characters designate like or corresponding parts throughout the several views, a wheelchair footrest retractor 10 is shown for use with a wheelchair 14. The wheelchair 14 is of the conventional type with a pair of footrests 16 and 18 mounted thereon to support the feet and legs of the wheelchair user. Each of the footrests 16 and 18 mount a footplate 20 at the lower end thereof. Footplates 20 are pivotally mounted to the footrests 16 and 18, allowing them to be manually pivoted downwardly to the use position and upwardly to the retracted position to allow the user to get in or out of the wheelchair. As will be described in greater detail hereinafter, the wheelchair footrest retractor 10 allows the user or caregiver to pivot the footplates 20 remotely very easily and conveniently between the downward use position and the upper retracted position.

The footrests 16 and 18 shown in the drawings are of the type that can be pivoted to the side of the wheelchair, if desired, by manipulating the lever 22 thereon. However, the wheelchair footrest retractor can as readily be used on other types of footrests as well. Footrests 16 and 18 can be adjusted in length as the lower section 26 of the footrest telescopes into the upper section 24, allowing the position of the footplate 20 to be adjusted as needed for the height of the user.

The wheelchair footrest retractor 10 can be mounted to the footrests 16 and 18 with little or no modification of the footrest. The retractor 10 includes an upper bracket 50 mounted to the upper section 24 and a lower bracket 52 mounted to the outer edge 54 of the footplate 20. A handle 56 is pivoted at one end to the upper bracket 50. As shown, the handle 56 has somewhat of a boomerang shape in order to raise the effective height of the handle 56, making it easier to reach for the wheelchair user or caregiver. A rod 58 is pivotally mounted at its upper end 60 along the handle 56 by a universal joint 64, and at its lower end 62 to the lower bracket 52 by a universal joint 64. As can be readily seen, the footplate 20 can be easily moved between the upper retracted position and the lower use position by simply manipulating handle 56. Pushing the handle 56 down will push the rod 58 down and thereby the lower bracket 52, which causes the footplate 20 to rotate upwardly, retracting the footplate 20 out of the way of the user. Pulling up on the handle 56 lifts the rod 58 and thereby lifts the lower bracket 52, which causes the footplate to rotate downwardly for use by the wheelchair user.

The handle 56 is positioned at the top of the footrests 16 and 18, slightly under and to the side of the knees of the wheelchair user. This provides the most convenient position for manipulation by the user or the caregiver, while positioning the handle 56 away from positions where it might be inconvenient or accidently be hit or moved inadvertently.

Figure 2:
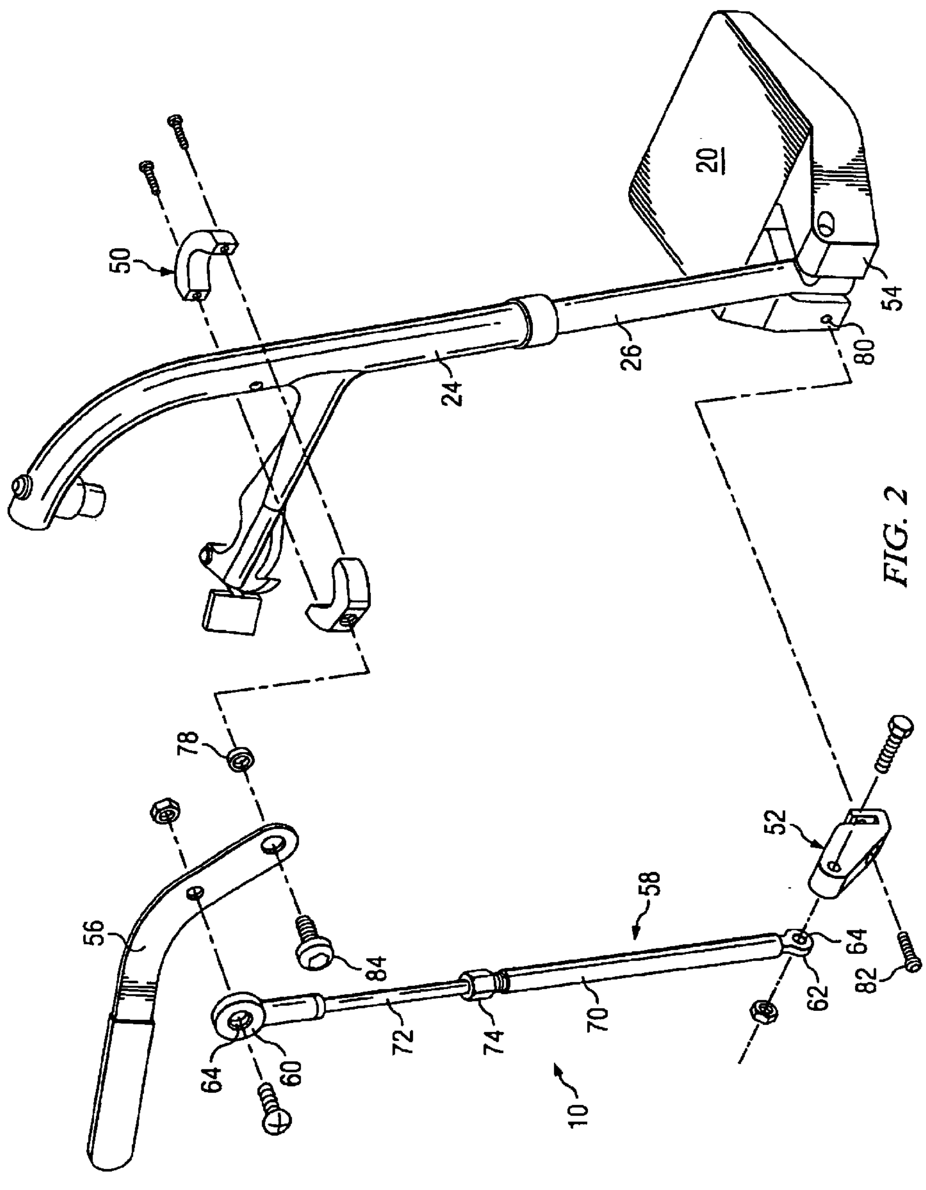
FIG. 2 is an exploded view of the wheelchair footrest retractor mounted on the footrest.
Figure 5:
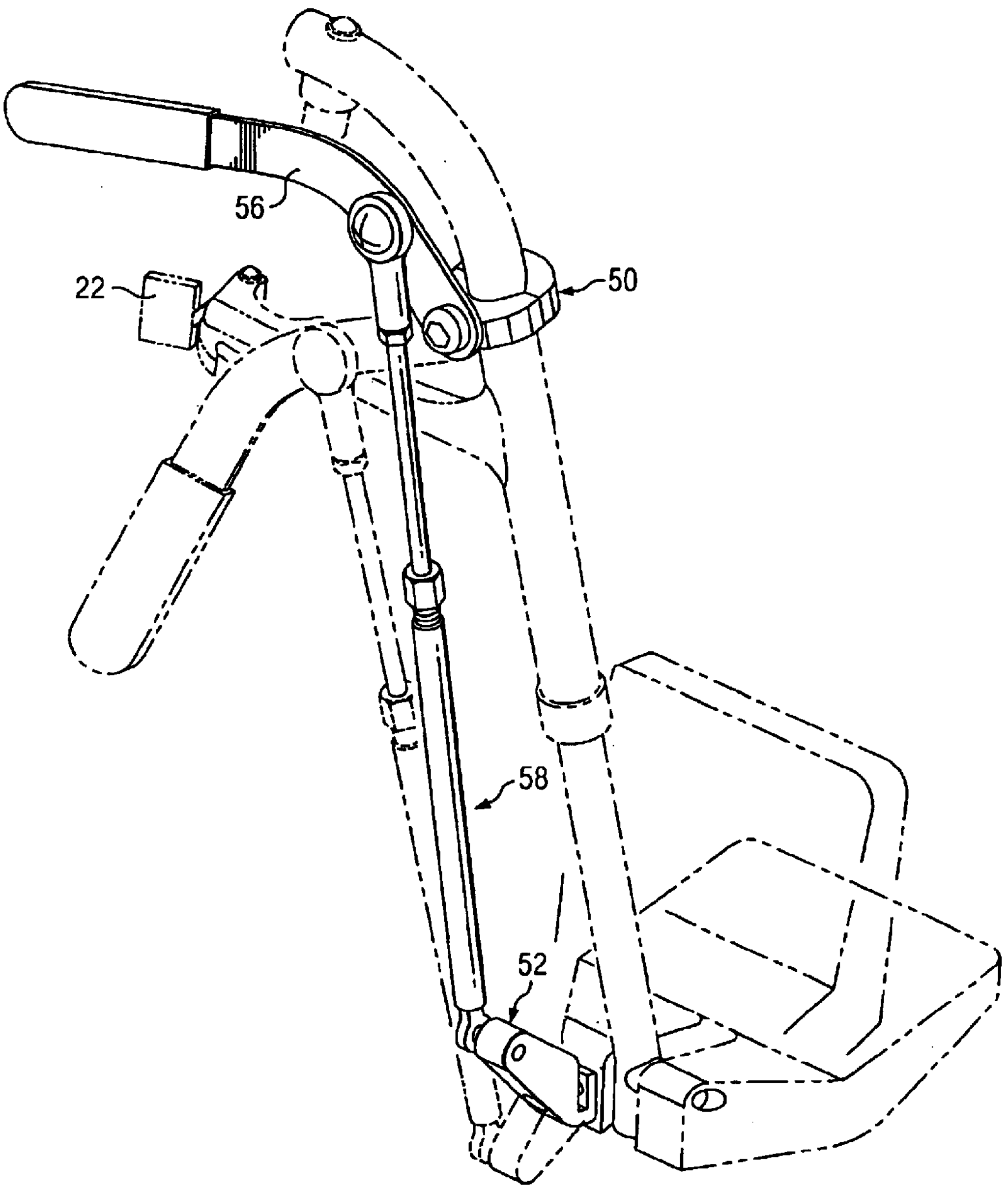
FIG. 5 is a view of the wheelchair footrest retractor with the footplate shown in the upper retracted position and lower use position.

The upper bracket 50 is clamped to the footrest 16 and 18 at a point just below the knee of the wheelchair user. The bracket 50 is preferably a simple compression clamp which does not require any modification of the footrest. However, if desired, the footrest 16 and 18 can be modified to secure the bracket 50 thereto, or even to have the handle 56 pivoted directly thereto, eliminating the need for the upper bracket 50. The handle 56 preferably has a small barrel washer 78 at the point where it connects to the upper bracket 50, such that the screw 84 mounting the handle 56 to the upper bracket 50 can be tightened securely, while allowing the handle 56 to pivot easily relative the upper bracket 50. The lower bracket 52 is preferably attached to the footplate 20 by drilling one small hole 80 through the outside face of the footplate 20 as seen in FIGS. 2 and 4 to receive a bolt 82 to bolt the lower bracket 52 thereon. The lower bracket 52 can be used as a drill guide to facilitate proper positioning of the hole 80. It is also possible to simply mount the lower bracket 52 on the footplate 20 without modifying the footplate 20 by using a suitable lower bracket 52 shaped to fit around the footplate 20 and be clamped thereto. However, the presence of one hole drilled in the footplate 20 is such a minor alteration to the footplate that this would be completely acceptable. The lower bracket 52 can also have a barrel washer to provide adequate spacing to attach the rod 58.

As seen in the Figures, the rod 58 is preferably adjustable in length. The rod 58 can be formed of a lower tube 70 with an upper rod 72 telescoped therein. A ferrule nut 74 with one or more compression washers can secure the upper rod 72 at the desired position relative to lower tube 70. The adjustability of the length of rod 58 allows the wheelchair footrest retractor 10 to be adjusted as needed to fit a particular wheelchair 14. Also, the adjustability of the length of rod 58 allows for the length adjustment of the footrests 16 and 18 necessary to provide adjustment for tall and short wheelchair users. Alternatively, the nut 74 and compression washers can be replaced by a series of aligned holes 100 formed in the lower tube 70, as seen in FIG. 1. A similar hole(not shown) is formed in the upper rod 72. The hole in the rod 72 is aligned with one of the series of aligned holes 100 in the lower tube 70 corresponding to the desired length of the rod 58 and a pin 102 is then inserted through the aligned holes to fix the length of the rod 58. Pin 102 can be a simple cotter pin, a pin with a snap spring to fit around the tube 70 to hold the pin in place, a bolt, or any other suitable design.

In another modification, the rod 58 can be replaced with a Bowden cable that manipulates footplate 20 by moving handle 56. This is the type of cable used on many bicycles, motorcycles and in automobile throttle cables, etc., and includes an outer sheath fixed at its ends and an inner flexible cable slidable within the outer sheath. This type of cable allows both a pulling and a pushing action with the inner cable which, on its own, could only be used for a pulling action. In wheelchair footrest retractor 10, the upper end of the outer sheath would be secured to the upper bracket 50 or directly to the upper section 24 and the lower end of the outer sheath would be secured to the lower end of lower section 26 near the footplate 20. The inner cable would be secured at its upper end to the handle 56 at the same location to which the rod 58 would be secured and the lower end of the inner cable would be secured to the lower bracket 52 at the same location to which the rod 58 would be secured. Manipulation of the handle 56 would raise and lower the footplate 20 through the Bowden cable.

The wheelchair footrest retractor 10 can be retrofitted to virtually any design of wheelchair using only common hand tools and without making any significant modifications to the wheelchair or the footrest. Of course, the retractor 10 can also be supplied as original equipment for a wheelchair, or an available option therefore, allowing the retractor 10 to be designed specifically for a particular wheelchair. The upper bracket 50 preferably will at least fit either of the two most common footrest support tube sizes of ⅞ or 1 inch diameter, but can be adapted for other support tube sizes. The upper bracket 50 is also preferably of two pieces that can be attached with two bolts or screws.

It will be understood that the wheelchair footrest retractor 10 of the present invention can be easily attached to a wide variety of wheelchairs and provides for easy manipulation of the footplates 20 by the wheelchair user and caregiver. Even so, the footplates 20 can still be easily manipulated in the traditional fashion by moving the footplates 20 directly by hand. The wheelchair footrest retractor 10 can be easily removed from a wheelchair to be placed on another wheelchair, or stored for later use, as desired. One retractor 10 constructed in accordance with the teachings of the present invention was installed on a "Quickie" style wheelchair manufactured by Sunrise Medical, and found to function well.

An advantage of the wheelchair footrest retractor 10 of the present invention is the fact that the retractor 10 does not increase the total width of the wheelchair, either when the wheelchair is in use, or when the wheelchair is folded. Another advantage is that the retractor 10 mounts to the outside of the footrests 16 and 18 so as not to interfere with support or movement of the leg or foot. Another advantage is that the retractor 10 uses identical parts to be mounted on the left or right side footrests 16 and 18.

While a single embodiment of the present invention has been illustrated in the accompanying drawings and described in the foregoing detailed description, it will be understood that the invention is not limited to the embodiment disclosed, but is capable of numerous rearrangements, modifications and substitutions of parts and elements without departing the scope and spirit of the invention.

What is claimed is:

1. A wheelchair footrest retractor for use on a wheelchair having a footrest, the footrest having a footplate pivoted thereto, comprising:

an upper bracket mounted to the footrest;

a lower bracket mounted to the footplate;

a handle pivoted to the upper bracket in a position to be readily manipulated by a user of the wheelchair or a caregiver;

a rod pivoted at a first end to the handle and at a second end to the lower bracket, the user or caregiver manipulating the handle to move the footplate between a downward use position and an upper retracted position.

2. The wheelchair footrest retractor of claim 1 wherein the length of the rod is adjustable to adapt the wheelchair footrest retractor to a particular wheelchair or length of footrest.

3. The wheelchair footrest retractor of claim 1 wherein the wheelchair footrest retractor is mounted to the wheelchair footrest without significant modification of the wheelchair footrest.

4. The wheelchair footrest retractor of claim 1 wherein the wheelchair footrest retractor is mounted to the wheelchair without modification of the wheelchair other than the wheelchair footrest.

5. The wheelchair footrest retractor of claim 1 wherein the upper bracket is mounted to the footrest by two bolts or screws.

6. The wheelchair footrest retractor of claim 1 wherein the rod includes a hollow tube, a solid rod partially telescoped within the hollow tube and a mechanism to fix the solid rod relative the hollow tube to adjust the distance between the first end and the second end.

7. The wheelchair footrest retractor of claim 1 wherein the handle has a boomerang shape.

8. The wheelchair footrest retractor of claim 1 wherein the rod is pivotally mounted to the handle at a point spaced from the pivotal mounting of the handle to the upper bracket.

9. The wheelchair footrest retractor of claim 1 wherein the second end of the rod is connected to the footplate by a universal joint.

10. The wheelchair footrest retractor of claim 1 wherein the wheelchair includes left and right footrest, the wheelchair footrest retractor being mountable on either the left or right footrest without modification.

11. A wheelchair footrest retractor for use on a wheelchair having a footrest, the footrest having a footplate pivoted thereto, comprising:

an upper bracket mounted to the footrest, the upper bracket being mounted by two bolts or screws;

a lower bracket mounted to the footplate;

a handle pivoted to the upper bracket in a position to be readily manipulated by a user of the wheelchair or a caregiver, the handle having a boomerang shape;

a rod pivoted at a first end to the handle through a universal joint at a point on the handle spaced from the pivotal mount to the upper bracket and at a second end to the lower bracket, the rod pivoted to the lower bracket through a universal joint, the user or caregiver manipulating the handle to move the footplate between a downward use position and an upper retracted position.

12. The wheelchair footrest retractor of claim 11 wherein the rod includes a hollow tube, a solid rod partially telescoped within the hollow tube and a mechanism to fix the solid rod relative the hollow tube to adjust the distance between the first end and the second end.

13. The wheelchair footrest retractor of claim 11 wherein the wheelchair includes left and right footrests, the wheelchair footrest retractor being mountable on either the left or right footrest without modification.

* * * * *